United States Patent
Polini et al.

[11] Patent Number: 5,904,184
[45] Date of Patent: May 18, 1999

[54] REINFORCED FLEXIBLE TUBE, IN PARTICULAR FOR USE IN OLEODYNAMIC CIRCUITS

[75] Inventors: Ernesto Polini, Ascoli Piceno; Paolo Seghi, Milan, both of Italy

[73] Assignee: Manuli Rubber Industries, S.p.A. Zona Industriale Campolungo, Ascoli Piceno, Italy

[21] Appl. No.: 08/836,407

[22] PCT Filed: Oct. 30, 1995

[86] PCT No.: PCT/EP95/04261

§ 371 Date: May 1, 1997

§ 102(e) Date: May 1, 1997

[87] PCT Pub. No.: WO96/14532

PCT Pub. Date: May 17, 1996

[30] Foreign Application Priority Data

Nov. 3, 1994 [IT] Italy .................................. T094A0877

[51] Int. Cl.⁶ ............................................... F16L 11/08
[52] U.S. Cl. .................... 138/126; 138/130; 138/124; 138/137
[58] Field of Search ........................... 138/126, 123, 138/129, 139, 124, 127, 137, 140

[56] References Cited

U.S. PATENT DOCUMENTS

| | | | |
|---|---|---|---|
| 3,296,047 | 1/1967 | Parr | 156/86 |
| 3,357,456 | 12/1967 | Grawey et al. | 138/127 |
| 3,921,674 | 11/1975 | Logan et al. | 138/130 |
| 4,102,360 | 7/1978 | Hopkins | 138/126 X |
| 4,262,704 | 4/1981 | Grawey | 138/130 |
| 4,488,577 | 12/1984 | Shilad et al. | 138/126 X |
| 4,499,926 | 2/1985 | Friberg | 138/126 |
| 5,660,210 | 8/1997 | Ikeda et al. | 138/126 |

FOREIGN PATENT DOCUMENTS

| | | | |
|---|---|---|---|
| 1007229 | 10/1965 | United Kingdom | B32B 5/02 |
| 1400003 | 7/1975 | United Kingdom . | |

*Primary Examiner*—Patrick F. Brinson
*Attorney, Agent, or Firm*—Needle & Rosenberg, P.C.

[57] ABSTRACT

A flexible tube (10), in particular for use in oleodynamic circuits, comprises a substrate shaped in the form of a tubular core (12) around which at least one reinforcing layer (14) is arranged. The substrate (12) comprises a radially internal layer of elastomeric material extruded longitudinally (16) and a radially external layer (20) obtained as a result of winding a strip of rubber-coated fabric spirally around the internal layer (16).

15 Claims, 1 Drawing Sheet

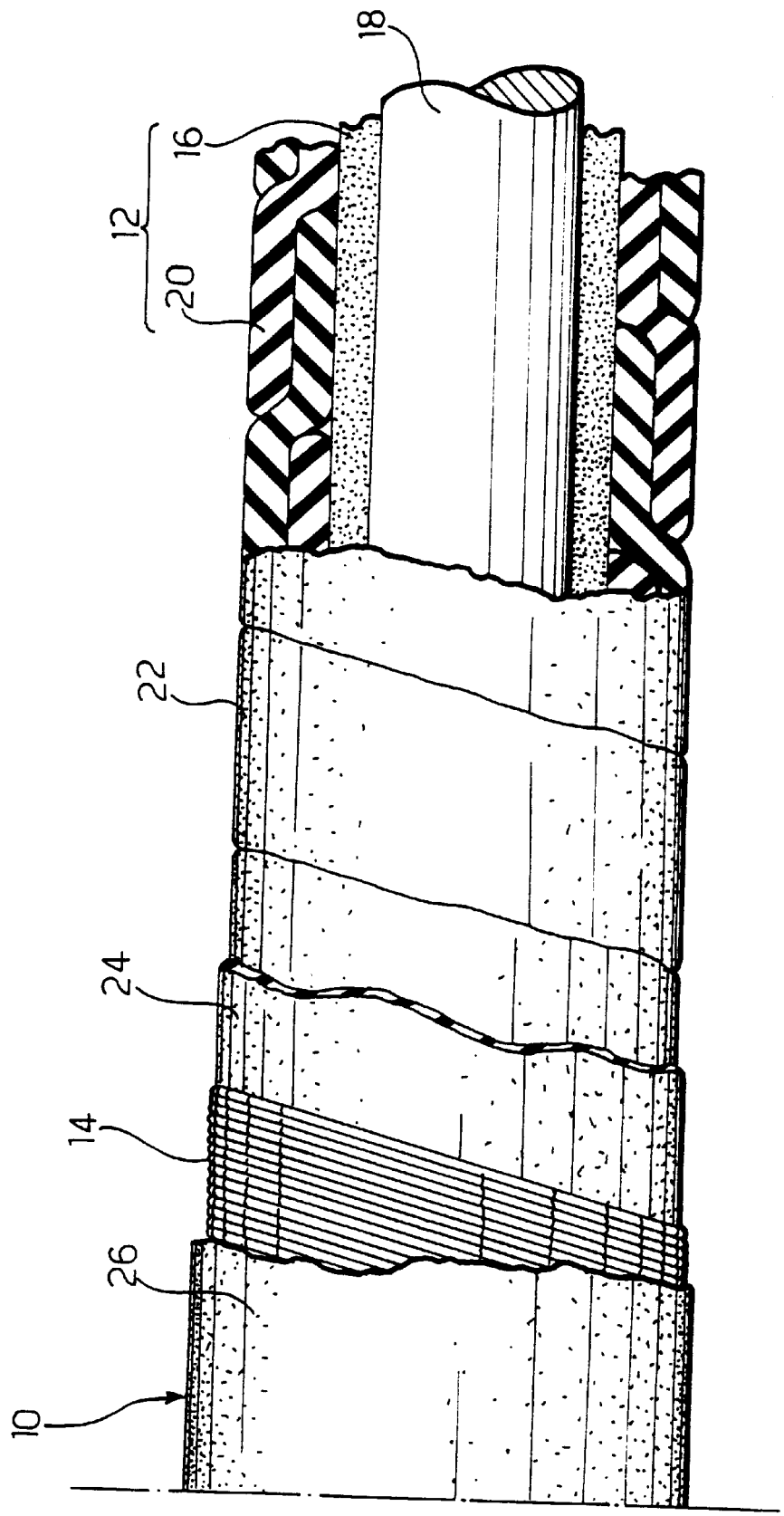

REINFORCED FLEXIBLE TUBE, IN PARTICULAR FOR USE IN OLEODYNAMIC CIRCUITS

The present invention relates to a flexible tube, in particular for use in oleodynamic circuits subjected to very high pressures, comprising a substrate shaped in the form of a tubular core around which at least one reinforcing layer is arranged.

The aim of the present invention is to provide a flexible tube which has the properties necessary for the use indicated above, with respect in particular to mechanical and chemical resistance, and which at the same time has a simple structure compatible with the usual techniques employed in the production of flexible tubes.

This aim is achieved by means of a flexible tube of the type indicated above which is characterised in that the substrate comprises a radially internal layer of elastomeric material extruded longitudinally and a radially external layer obtained as a result of winding a strip of rubber-coated fabric spirally around the internal layer.

The substrate has, overall, a thickness which is preferably between 0.5 and 6 mm, and the ratio between the thicknesses of the radially internal and external layers is preferably between 0.1 and 10.

Each of the two layers forming the core of the tube of the invention confers on the tube some of the properties necessary to satisfy requirements in use.

To be more specific, the extruded internal layer ensures complete impermeability to the fluid flowing inside.

This impermeability could not be reliably ensured by a wound internal layer because of the possibility of errors occurring during its manufacturing process. This process provides that a strip of material is wound spirally around a central spindle, partially overlapping adjacent turns in the direction of the width of the strip. If, however, the overlapping is not carried out correctly, leaving a gap between adjacent turns, the fluid flowing in the tube may pass through the gap and damage the structure of the tube irreparably.

The fact that the external layer of rubber-coated fabric is wound clearly does not jeopardise the impermeability of the tube but, rather, confers an advantageous firmness to its structure owing both to the possibility of using elastomeric materials that differ from those of the internal layer and therefore have the necessary mechanical characteristics, and to the presence of the reinforcing fabric associated with the rubber.

This structure of the external layer is thus capable of withstanding satisfactorily the stresses which are transmitted to it both during the vulcanisation phase and during use, especially when high-performance steels capable of withstanding extremely high loads are used in the reinforcing layer(s).

More generally, the external layer of the core confers on the tube according to the invention excellent properties of mechanical strength while the internal layer confers on it excellent sealing and chemical resistance properties.

This functional separation can advantageously be optimised by using different materials for the compositions employed in the manufacture of these two layers.

For example, it is possible to use for the internal extruded layer compositions having excellent resistance to oils of vegetable origin, the use of which is becoming ever more widespread, even if these compositions have a reduced mechanical strength, because this latter property is conferred to a sufficient degree by the external wound layer.

The double-layered structure of the substrate, shaped in the form of a tubular core, of the tube according to the invention also constitutes intrinsic security against possible defects in one of the two layers, by guaranteeing that the tube performs its function even if there are such defects.

One or more reinforcing layers which are preferably produced by coiling and/or braiding technology are arranged coaxially around the substrate of the tube of the invention.

In this last case in particular high-pressure tubes are obtained which are capable of withstanding high torsional and bending stresses, with the external layer of the core, which layer acts as a support for the braided reinforcing layer lying over it and which restricts the swelling of the extruded layer beneath it, exercising overall an anti-burst barrier action.

The overall thickness of the substrate of the tube of the invention may be less than that which would be necessary if this substrate were made entirely of extruded elastomeric material or of wound rubber-coated fabric. This therefore increases the mechanical efficiency of the braided reinforcing layer which may be arranged in accordance with a greater curvature.

Other advantages and characteristics of the present invention will become clear from the following detailed description which is given with reference to the appended drawing which is provided purely by way of non-limiting example and in which:

the single FIGURE is a partially sectional side view of a piece of tube according to the invention fitted on a spindle.

A flexible tube 10, in particular for use in oleodynamic circuits, comprises a substrate shaped in the form of a tubular core 12 around which is arranged a reinforcing layer 14 which is produced by braiding or coiling technology.

The core 12 is formed by a radially internal layer 16 of elastomeric material extruded longitudinally around a spindle 18 and by a radially external layer 20 obtained as a result of winding a strip of rubber-coated fabric spirally around the internal layer 16.

The winding operation, and also the extruding operation, are carried out using techniques and machinery customarily employed in the production of flexible tubes.

The strip is wound in such a manner that its fabric surface 22 is remote from the radially internal layer 16 of extruded elastomeric material and in such a manner that adjacent turns overlap to half of the width of the strip.

An external layer 20 of which the thickness is double than that of the strip is thus obtained. It is of course possible to overlap adjacent turns to a greater extent, thus producing a corresponding increase in the thickness of the wound external layer 20.

The latter layer may be covered with an additional elastomeric layer 24 which may, for example, be wound spirally in the longitudinal direction and which promotes the adhesion of the reinforcing layer 14 to the core 12.

Alternatively, this adhesive elastomeric layer may be integrated in the strip of rubber-coated fabric which would then be composed of the fabric contained between two layers of rubber. The entire sandwich can be obtained by means of the same calendering process.

The resulting structure thus has an elastomeric covering layer 26 and the tube 10 thus produced is subjected to vulcanisation.

The composite structure of the core 12 of the tube 10 makes it possible to obtain all the advantages associated with the technologies of extrusion and winding used for the manufacture of the internal layer 16 and the external layer 20, respectively.

The extruded internal layer 16 ensures impermeability and can be produced using materials which exhibit a high degree of chemical resistance to the fluid which flows inside the tube 10, even if those materials have a reduced mechanical strength, this strength in any case being guaranteed by the wound external layer 20.

Naturally, it will be appreciated that, the principle of the invention remaining the same, the details of construction and forms of embodiment may vary widely with respect to those described and illustrated in the drawing, without thereby departing from the scope of the present invention.

For example, in embodiments not illustrated of the tube of the invention, it is possible to arrange coaxially around the core more reinforcing layers produced by braiding and/or coiling technologies and/or simply to arrange the turns of the wound external layer of the core close together without causing any overlapping between them.

We claim:

1. A flexible tube, in particular for use in oleodynamic circuits, comprising a substrate shaped in the form of a tubular core around which at least one reinforcing layer is arranged, said substrate comprising a radially internal layer of elastomeric material extruded longitudinally and a radially external layer obtained as a result of winding a strip of rubber-coated fabric spirally around the internal layer, wherein the at least one reinforcing layer of said tube is produced by braiding or coiling technology.

2. A flexible tube according to claim 1, wherein the strip of rubber-coated fabric is wound in such a manner that its fabric surface is remote from the radially internal layer of extruded elastomeric material.

3. A flexible tube according to either of the preceding claims, wherein the strip is wound round the radially internal layer, overlapping adjacent turns to at least half of the width of the strip.

4. A flexible tube according to claim 1, wherein the radially external layer of the core is covered with an additional elastomeric layer which promotes the adhesion of the reinforcing layer to the core.

5. A flexible tube according to claim 1, wherein the substrate shaped in the form of a tubular core has a thickness of between 0.5 and 6 mm.

6. A flexible tube according to claim 1, wherein the ratio between the thicknesses of the radially internal and external layers is between 0.1 and 10.

7. A flexible tube according to claim 2, wherein the radially external layer of the core is covered with an additional elastomeric layer which promotes the adhesion of the reinforcing layer to the core.

8. A flexible tube according to claim 3, wherein the radially external layer of the core is covered with an additional elastomeric layer which promotes the adhesion of the reinforcing layer to the core.

9. A flexible tube according to claim 2, wherein the substrate shaped in the form of a tubular core has a thickness of between 0.5 and 6 mm.

10. A flexible tube according to claim 3, wherein the substrate shaped in the form of a tubular core has a thickness of between 0.5 and 6 mm.

11. A flexible tube according to claim 4, wherein the substrate shaped in the form of a tubular core has a thickness of between 0.5 and 6 mm.

12. A flexible tube according to claim 2, wherein the ratio between the thicknesses of the radially internal and external layers is between 0.1 and 10.

13. A flexible tube according to claim 3, wherein the ratio between the thicknesses of the radially internal and external layers is between 0.1 and 10.

14. A flexible tube according to claim 4, wherein the ratio between the thicknesses of the radially internal and external layers is between 0.1 and 10.

15. A flexible tube according to claim 5, wherein the ratio between the thicknesses of the radially internal and external layers is between 0.1 and 10.

* * * * *